United States Patent [19]

Sato

[11] Patent Number: 4,727,005
[45] Date of Patent: Feb. 23, 1988

[54] MAGNETO-OPTICAL RECORDING MEDIUM HAVING AMORPHOUS ARTIFICIALLY LAYERED STRUCTURE OF RARE EARTH ELEMENT AND TRANSITION METAL ELEMENT

[75] Inventor: Noboru Sato, Kanagawa, Japan

[73] Assignee: Sony Corporation, Tokyo, Japan

[21] Appl. No.: 889,962

[22] Filed: Jul. 28, 1986

Related U.S. Application Data

[60] Continuation of Ser. No. 802,992, Nov. 29, 1985, Pat. No. 4,670,356, which is a division of Ser. No. 613,383, May 23, 1984, Pat. No. 4,576,699.

[30] Foreign Application Priority Data

Jul. 26, 1985 [JP] Japan .................................. 60-166326
Nov. 28, 1985 [JP] Japan .................................. 60-267780

[51] Int. Cl.$^4$ .................................................. G11B 7/24
[52] U.S. Cl. ..................... 428/693; 427/132; 427/131; 428/694; 428/900; 428/678; 428/681; 428/928
[58] Field of Search ............... 428/693, 694, 900, 678, 428/928; 427/131, 132, 128; 365/132, 122; 204/192 M, 192 P; 369/13, 288; 360/131, 134, 135

[56] References Cited

U.S. PATENT DOCUMENTS

| | | | |
|---|---|---|---|
| 3,229,273 | 11/1966 | Baaba | 428/900 |
| 4,042,341 | 8/1977 | Smegil | 428/678 |
| 4,210,946 | 2/1980 | Iwasaki | 428/900 |
| 4,277,809 | 7/1981 | Fisher | 428/900 |
| 4,293,621 | 10/1981 | Togami | 428/678 |
| 4,367,257 | 11/1983 | Arai | 428/220 |
| 4,556,291 | 12/1985 | Chen | 428/900 |
| 4,628,485 | 12/1986 | Tanaka | 428/692 |
| 4,670,356 | 6/1987 | Sato | 428/694 |

FOREIGN PATENT DOCUMENTS 0108112  5/1986  Japan .

Primary Examiner—Ellis P. Robinson
Attorney, Agent, or Firm—Hill, Van Santen, Steadman & Simpson

[57] ABSTRACT

A magneto-optical recording medium is disclosed. The medium comprises a substrate and a magnetic layer formed thereon. The magnetic layer has a multi layered structure in which rare earth metal element layers and transition metal layers are alternately superposed with each other, with layer thickness of the order of an atomic layer. The layer thickness of the rare earth metal element is selected not less than 2 Å but less than 6 Å.

2 Claims, 11 Drawing Figures

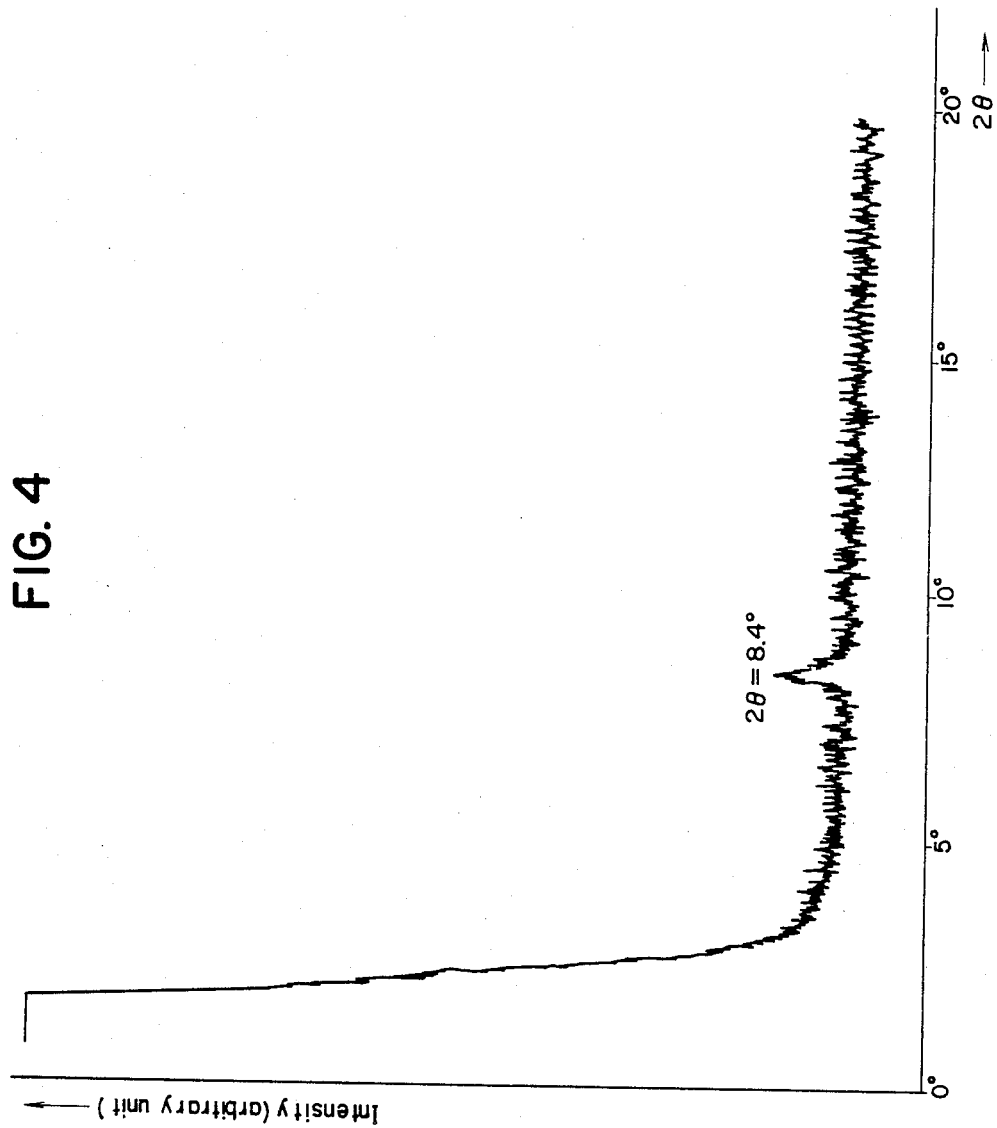

MAGNETO-OPTICAL RECORDING MEDIUM HAVING AMORPHOUS ARTIFICIALLY LAYERED STRUCTURE OF RARE EARTH ELEMENT AND TRANSITION METAL ELEMENT

CROSS REFERENCE TO THE RELATED APPLICATION

The present application is a continuation in part of my copending application U.S. Ser. No. 802,992, filed Nov. 29, 1985 now U.S. Pat. No. 4,670,356 which is a division of U.S. Ser. No. 613,383 filed May 23, 1984, now U.S. Pat. No. 4,576,699.

BACKGROUND OF THE INVENTION

The present invention relates to a magneto-optical recording medium in which a recording layer is formed of rare earth element and transition metal element having an amorphous state.

A magneto-optical recording is known in which the signal is recorded on a magneto-optical recording layer having perpendicular magnetic anisotropy in the direction of magnetization and a signal thus recorded is reproduced by irradiating with a linearly polarized light beam and detecting rotation of polarization caused by the interaction with the magnetization. One example of the magneto-optical recording layer is an amorphous alloy of a rare earth element and a transition metal element.

The applicant proposed an improved magneto-optical recording medium having a multi layer structure formed of the rare earth element and the transition metal element, in the aforementioned patent applications. The magneto-optical recording medium had an improved coercive force and rectangular ratio over the prior art magneto-optical recording medium having uniform mixture of the rare earth and transition metal elements.

SUMMARY OF THE INVENTION

It is an object of the present invention to provide an improved magneto-optical recording medium.

It is another object of the present invention to provide a magneto-optical recording medium having an artificially layered structure of rare earth element and transition metal element.

According to one aspect of the present invention, there is provided a magneto-optical recording medium which comprises a substrate and a magneto-optical recording layer formed on the substrate. The magneto-optical recording layer is formed of multi layers of rare earth element and transition metal element alternately superposed with a thickness of each layer of rare earth element being not less than 2Å but less than 6Å. The magneto-optical recording layer has a composition containing 10 to 40 atomic percent of rare earth element excluding the compensation composition of the alloy.

BRIEF DESCRIPTION OF THE DRAWINGS

FIGS. 4 and 9 are small angle X-ray diffraction patterns for magneto-optical recording layers according to the present invention;

DESCRIPTION OF THE PREFERRED EMBODIMENTS

Figure 1:
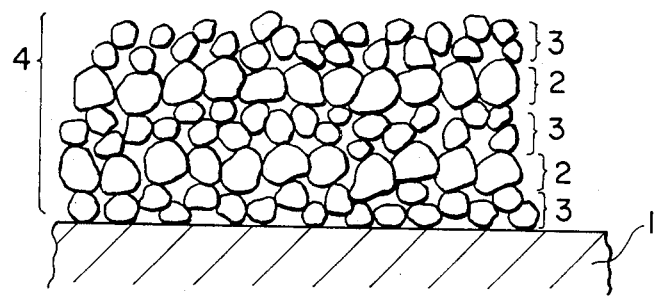
FIG. 1 is a schematic enlarged cross-sectional illustration of a magneto-optical recording layer of the present invention.

FIG. 1 shows a schematic cross-sectional illustration of a magneto-optical recording medium of the present invention. In FIG. 1, on a substrate 1 made of, for example, glass, acrylic resin or polycarbonate resin, there is provided a magnetic layer 4 for magneto-optical recording having magnetic anisotropy perpendicular to a surface of the layer. The magnetic layer 4 is formed of multi layers of rare earth metal element layers 2 made of one or more of terbium (Tb), dysprosium (Dy), and gadolinium (Gd) and transition metal element layers 3 made of one or more of iron (Fe), cobalt (Co) and nickel (Ni) alternately superposed with each other. The rare earth metal element layer 2 and the transition metal element layer 3, each has an extremely thin thickness of an atomic layer order, and the rare earth element layer thickness is selected not less than 2 angstroms but less than 6 angstroms. The rare earth metal elements Tb, Dy, and Gd, each has an atomic radius about 3.5Å, the above layer thickness of the rare earth metal elements corresponds to an order of magnitude of a mono atomic layer or two atomic layers thickness.

The magnetic layer 4 is formed of a composition of 10 to 40 atomic % of the rare earth metal elements and balance of transition metal elements. However the compensation composition at room temperature is excluded even if the composition of the magnetic layer satisfies the above compositional range. In case of Tb-Fe magnetic layer, 22 to 23 atomic % of Tb is the compensation composition and 25 to 26 atomic % of Gd or Dy for Gd-Fe and Dy-Fe layers.

According to the present invention, the magneto-optical recording medium having high uniaxial magnetic anisotropy, high magnetization and high coercive is obtained, and magneto-optical recording of high density can be achieved. It is considered in the layered structure of the magneto-optical recording layer of the present invention, a basic structure formed of one rare earth metal atom and two transition metal atoms are coupled and arranged along a thickness direction of the layers thus deriving a perpendicular anisotropy in the layer efficiently.

Figure 2:
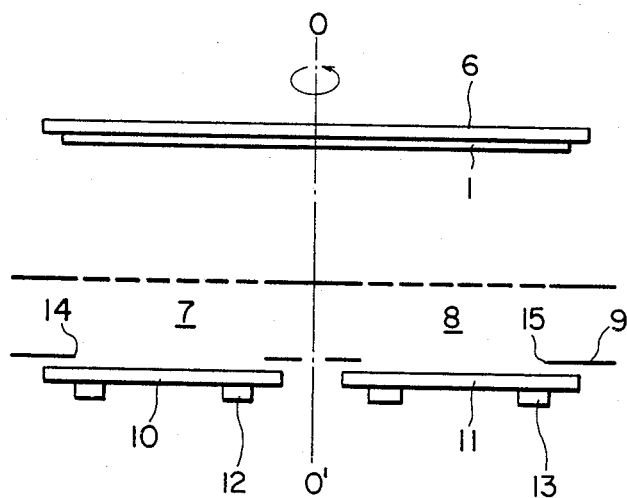
FIG. 2 is a schematic cross sectional view of a sputtering apparatus employed in manufacturing a magneto-optical recording medium of the present invention.
Figure 3:
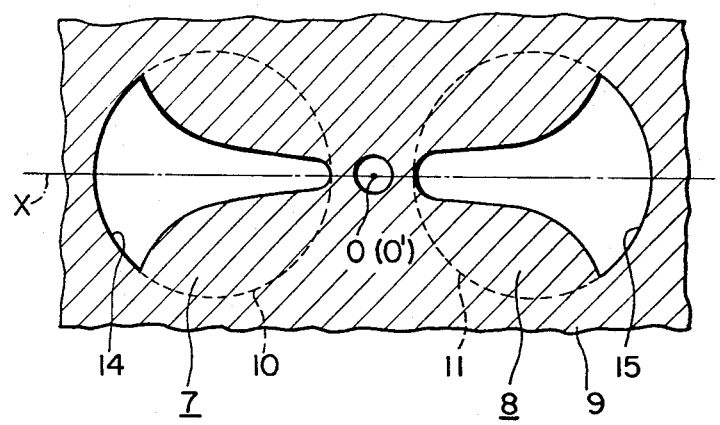
FIG. 3 is a plan view on an enlarged scale of the apparatus shown in FIG. 2.

The magnetic layer 4 can be manufactured by sputtering using a sputtering apparatus shown in FIGS. 2 and 3. There is provided a substrate holder 6 which is rotated around the axis 0 - 0'. A substrate 1 to which an magnetic layer is formed is mounted on the lower surface of the substrate holder 6. A pair of sputtering sources 7 and 8 are disposed in opposed relation to the substrate 1 with an equal angular spacing of 180° about the axis 0 - 0'. A mask 9 is disposed between the sputtering sources 7 and 8 and the substrate 1 to restrict the area of deposition on the substrate 1 from the sputtering sources 7 and 8. The sputtering source 7 includes a target 10 formed of a disk-shaped plate composed of the rare earth metal element, for example, Tb, while the sputtering source 8 includes a target 11 of a disk shaped plate of, for example, iron or alloy thereof. Magnets 12 and 13 are located beneath the targets 10 and 11. The whole structure is provided in an evacuated bell jar which is not shown in FIGS. 2 and 3 though.

As shown in FIG. 3, the mask 9 is provided at those positions opposite to the targets 10 and 11 with a pair of two windows 14 and 15 of a bell shape extending in widening relation toward both ends of a straight line shown by the reference character x which passes through the center of the targets 10 and 11. The rare earth metal is deposited from the target 10 at mainly the left hand portion on the substrate 1 through the window 14, and the transition metal is deposited from the target 11 mainly at the right hand portion on the substrate 1 through the window 15. The D.C. sputtering is carried out under the rotation of the substrate holder 6 with the substrate 1 around the axis 0 - 0' while keeping the targets 10 and 11 at negative potential. Thus by rotating the substrate 1, multi layer structure of the magnetic layer 4 is deposited having a total thickness ranging from 200 to 50000Å, for example, 1000Å.

EXAMPLE 1

A magnetic layer was formed on a glass substrate by using the sputtering apparatus as shown in FIGS. 2 and 3. The composition of the layer was 19 atomic % of Tb and 81 atomic % of Fe. The target 10 employed was formed of Tb and the target 11 employed was formed of Fe. The sputtering current for the targets 10 and 11 were 0.6A and 2.5A respectively and the deposition rates for Tb and Fe were about 1.5Å/sec and about 2.6Å/sec, under the above sputtering current. The substrate was rotated at a speed of 20 r.p.m.

It was confirmed by a small angle X-ray diffraction analysis that the magnetic layer of Tb and Fe had a layered structure of the rare earth metal Tb and the transition metal Fe where the layers were superposed alternately with each other. FIG. 4 shows the small angle X-ray diffraction pattern using Co-Kα X-ray, in which θ is an angle between a layer surface and an incident X-ray. In FIG. 4, a diffraction peak was recognized at $2\theta = 8.4°$. It was understood one pitch P formed of one rare earth metal Tb layer and one i transition metal Fe layer was 12.2Å, since layer thickness or the pitch of the periodic structure is calculated by a relation $2P \sin 2\theta/2 = \eta\lambda$

EXAMPLE 2

A magnetic layer formed of 21 atomic % of Tb and 79 atomic % of Fe was formed by using the sputtering apparatus shown in FIGS. 2 and 3 similar to Example 1.

Figure 5:
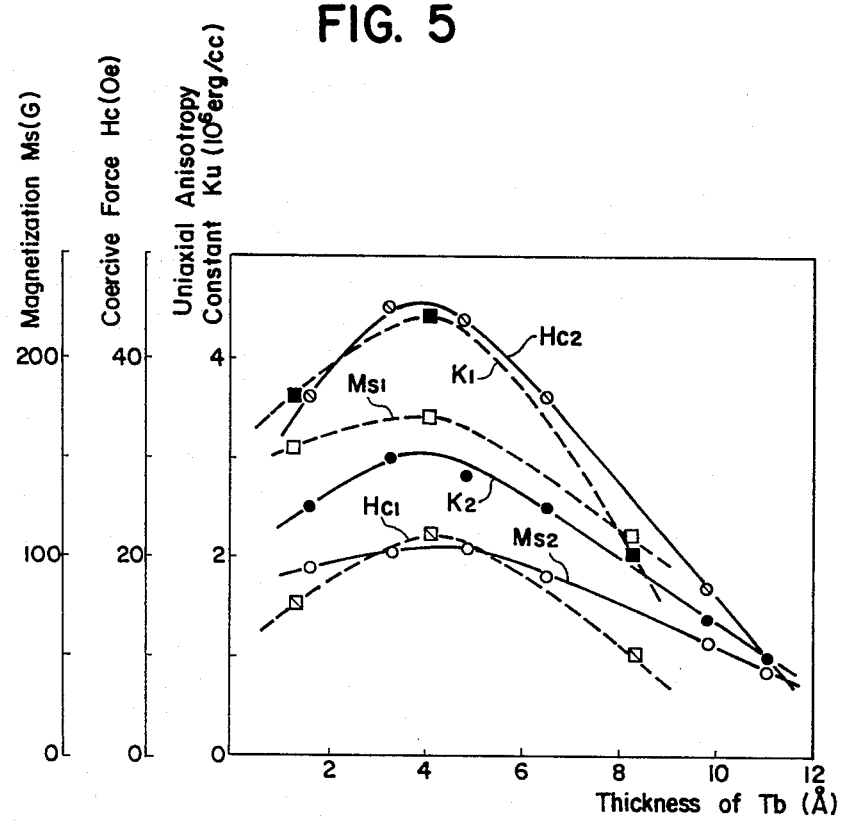
FIG. 5 is a graph showing a relation between a terbium (Tb) layer thickness and various magnetic characteristics.

A number of magnetic layers were formed by changing the sputtering current for each target resulting in a magnetic layer having various Tb layer thicknesses. FIG. 5 shows the relation between the Tb layer thickness and magnetic characteristics, magnetization (Ms), coercive force (Hc) and uniaxial anisotropy constant (Ku) for the magnetic layers containing 19 atomic %, and 21 atomic % Tb respectively. In FIG. 5 the dotted curves are characteristics of the magnetic layer containing 19 atomic % Tb, while the solid curves are characteristics of the magnetic layer containing 21 atomic % Tb as a whole. The curves $K_1$ and $K_2$ show uniaxial anisotropy constant, the curves $Ms_1$ and $Ms_2$ show magnetization and the curves $Hc_1$ and $Hc_2$ show coercive force.

According to FIG. 5, it is understood superior magnetic characteristics were obtained when the Tb layer thickness was not less than 2Å but not more than 6Å.

Figure 6:
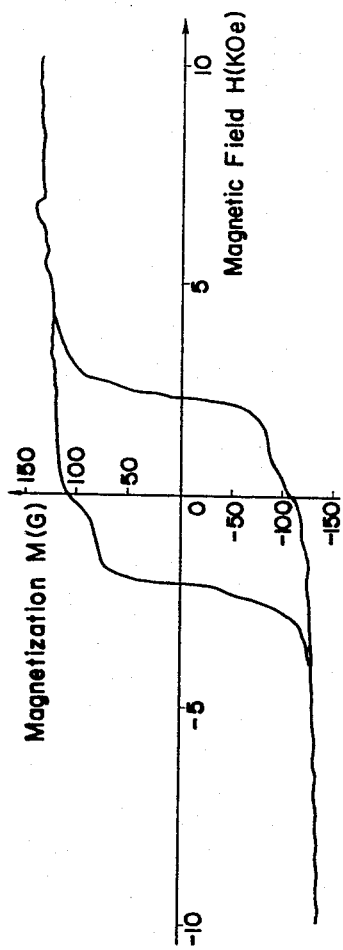
FIGS. 6 to 8 are magnetization curves for multi layer structures of the rare earth element and the transition metal element having various thickness of each layers.
Figure 7:
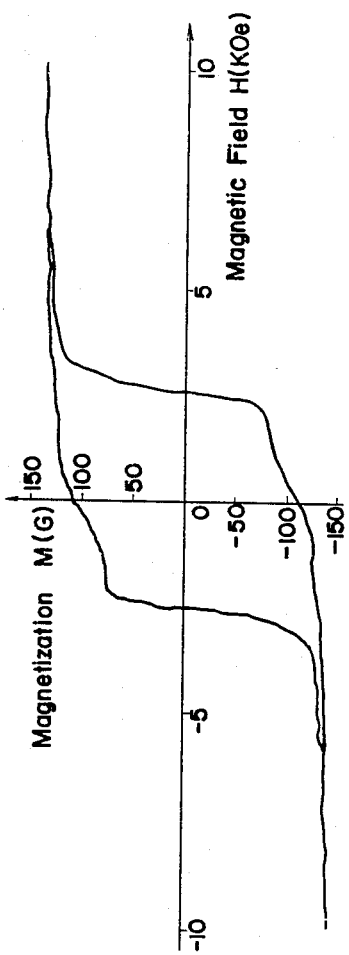
Figure 8:
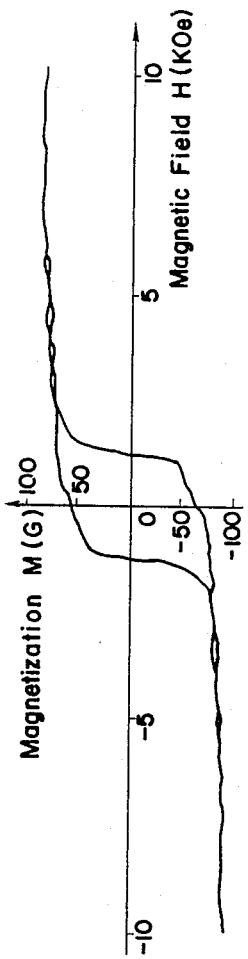

Magnetization curves for magnetic layers are shown in FIGS. 6 to 8 which were manufactured by changing the rotation speed of the substrate with the sputtering currents of 0.6A for the Tb target and 1.85A for the Fe target which corresponded to deposition rates 1.5Å/sec for Tb and 2.5Å/sec for Fe respectively. The layer thicknesses of the Tb layer and the Fe layer, magnetization (Ms) and coercive force (Hc) are shown in Table I.

TABLE I

| Sample | FIG. 6 | FIG. 7 | FIG. 8 |
|---|---|---|---|
| Tb layer thickness (Å) | 1.5 | 4.5 | 9 |
| Fe layer thickness (Å) | 2.5 | 7.5 | 15 |
| Ms (G) | 138 | 144 | 71 |
| Hc (Kθe) | 2.2 | 2.6 | 1.3 |

Among the samples, the magnetization curve shown in FIG. 7 shows superior magnetization, coercive force and rectangular ratio to the curves in FIGS. 6 and 8. The magnetic layer of FIG. 7 had Tb layer thickness of 4.5Å which is between 2 and 6Å.

EXAMPLE 3

Figure 9:
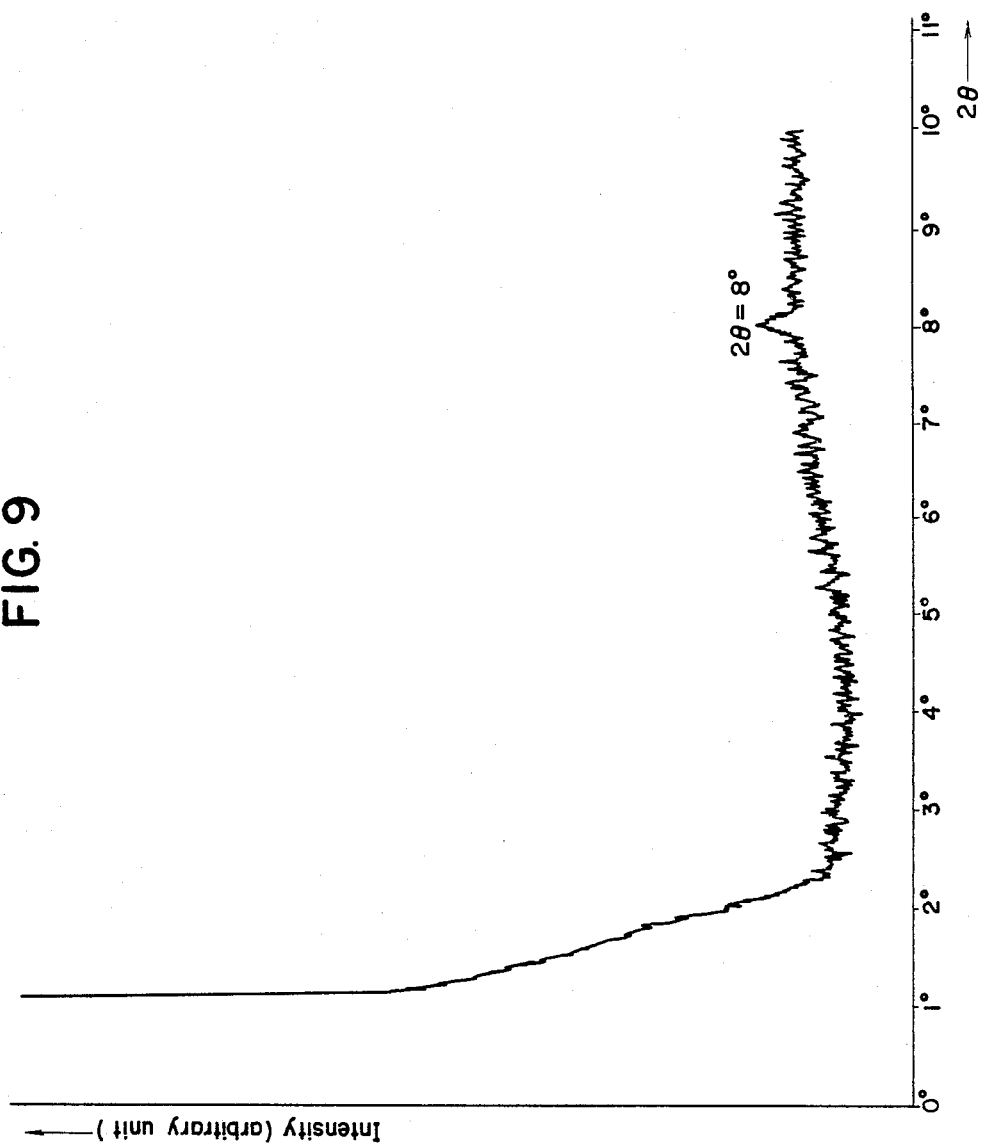

A magnetic layer was formed on a glass substrate by using the sputtering apparatus explained previously. The magnetic layer contained as a whole 20 atomic % of Tb and 80 atomic % of transition metal in which Fe and Co were employed with a ratio of 19:1 in atomic ratio. The composition can be expressed as $Tb_{20}(Fe_{95}Co_5)_{80}$. In this example, the target 10 was formed of Tb, and the target 11 was formed of $Fe_{95}Co_5$ alloy. The sputtering was carried out under the substrate rotation of 20 r.p.m. with the sputtering currents of 0.6A for Tb and 2.2A for FeCo target resulting the deposition rates of about 1.4Å/sec for Tb and about 2.6Å/sec for FeCo respectively. The result of small angle X-ray diffraction analysis is shown in FIG. 9 for the magnetic layer thus obtained. There was recognized a diffraction peak at $2\theta = 8°$ which determined that the pitch of periodic layered structure was 12.9Å.

Figure 10:
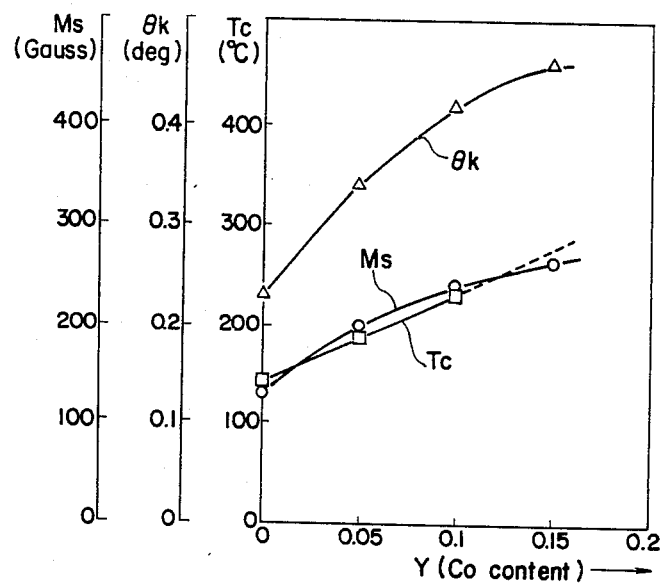
FIG. 10 is a graph showing a relation between a cobalt content (Y) and various characteristics.

FIG. 10 shows the relation of Co composition y as expressed $Tb-Fe_{1-y}Co_y$ and characteristics of the magnetic layer, magnetization (Ms), Kerr rotation angle (θk) and Curie temperature (Tc). It is understood from FIG. 10 that Ms and θk increased as the Co content increased, while Tc increased together. Thus too much Co content requires larger recording power. It is preferable to select the Co content between 1 and 30 atomic % for total amount of transition metal.

EXAMPLE 4

Gd-Fe magnetic layer was formed on a glass substrate by sputtering using a Gd target and a Fe target. Deposition rates were controlled as 1.5Å/sec for Gd and 2.6Å/sec for Fe. The magnetic layer was confirmed by the small angle X-ray diffraction to have a periodic layered structure of Gd layer and Fe layer having a pitch of 12.5Å.

EXAMPLE 5

Dy-Fe magnetic layer was formed on a glass substrate by sputtering using a Dy target and Fe target.

Figure 11:
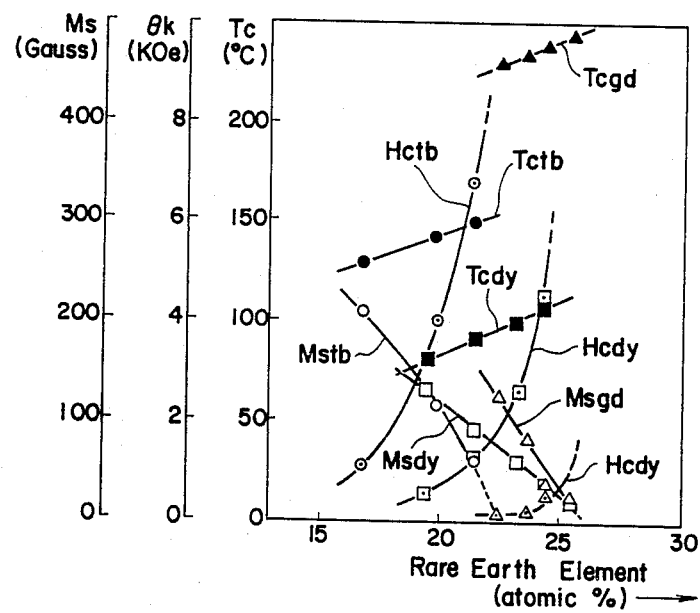
FIG. 11 is a graph showing a relation between the rare earth element composition and various characteristics.

Various characteristics of the magnetic layer according to examples 1, 4 and 5 are shown in FIG. 11, with respect to the rare earth metal content respectively. In FIG. 11, the curves Hctb, Hcgd and Hcdy are measured result of the coercive force upon compositional change of Tb, Gd and Dy, respectively. The curves Mstb, Msgd and Msdy are saturation magnetization, and the curves Tctb, Tcgd and Tcdy are Curie temperatures for Tb, Gd and Dy.

EXAMPLE 6

Gd-FeCo magnetic layer was made by sputtering, where Gd target and Fe-Co alloy target were used.

EXAMPLE 7

GdTb-Fe magnetic layer was made by sputtering, where $Gd_{20}Tb_{80}$ target and Fe target were used.

EXAMPLe 8

GdTb-FeCo magnetic layer was made by sputtering where $Gd_{20}Tb_{80}$ alloy target and $Fe_{95}Co_5$ alloy target were used.

EXAMPLe 9

TbDy-FeCo magnetic layer was made by sputtering where $Tb_{50}Dy_{50}$ alloy target and $Fe_{90}Co_{10}$ alloy target were used.

In these examples 6 to 9, the magnetic layer was confirmed to have the layered structure, and had a suitably high coercive force, magnetization and suitable Curie temperature.

As explained above, according to the present invention, a magnetic layer suitable for magneto-optical recording is provided in which rare earth metal layer and transition metal layer are alternately superposed with atomic layer order thickness.

I claim as my invention:

1. A magneto-optical recording medium having a high uniaxial magnetic anisotropy, a high magnetization, and a high coercive force, comprising a substrate and a magnetic layer formed on said substrate, said magnetic layer being formed of multi-layers of rare earth metal element layers selected from one or more of the metals Tb, Gd and Dy and transition metal element layers composed of Fe, Co, or Ni alternately superposed with each other, each of said rare earth metal element layers have a thickness not less than 2 Å but less than 6 Å, and said magnetic layer having a composition containing 10 to 40 atomic percent of rare earth metal element and the balance of transition metal element, excluding a compensation composition of the rare earth element and the transition metal element which contain 22 to 23 atomic percent Tb in the case of Tb-Fe layers, and 25 to 26 atomic percent Gd or Dy in the case of Gd-Fe and Dy-Fe layers.

2. A magneto-optical recording medium according to claim 1, said transition metal element layer is formed of Fe and Co, and the cobalt content is between 1 and 30 atomic % for total amount of Fe and Co.

* * * * *